UNITED STATES PATENT OFFICE.

T. CHALKLEY TAYLOR, OF PHILADELPHIA, PENNSYLVANIA.

IMPROVEMENT IN COMPOSITIONS FOR COATING BLOCKS OF CAUSTIC ALKALI.

Specification forming part of Letters Patent No. 164,405, dated June 15, 1875; application filed October 14, 1874.

*To all whom it may concern:*

Be it known that I, T. CHALKLEY TAYLOR, of Philadelphia, in the county of Philadelphia and State of Pennsylvania, have invented a new and valuable Improvement in Putting up Caustic Alkali; and I do hereby declare that the following is a full, clear, and exact description of the same.

This invention has relation to means for putting up caustic alkali (soda or potash) in merchantable packages, and excluding the air from the alkali to prevent it from deliquescing.

The nature of my invention consists in a coating for the blocks or pieces of alkali, which is composed of a fine earthy substance, and an oil or other equivalent fluid, which render the coating water-proof, and give to it toughness and a certain degree of flexibility to prevent it from cracking, as will be hereinafter explained.

The earthy substance may be plaster-of-paris, kaolin, whiting, terra alba, or any of the very fine earths; and the moistener may be linseed-oil, resin-oil, gelatinous silicate of soda, or a fluid which is known as a "drier," and which is composed of gum-copal and linseed-oil boiled together.

I have used with excellent results one part of linseed-oil to two parts of kaolin. I have also used one part of gelatinous silicate of soda instead of the oil above named.

The compound may be made of the consistence of putty, and plastered on the blocks of alkali, so as to completely envelop them; or, if desired, the compound may be made in a thick solution, and the blocks coated with it by a process of dipping.

For the purpose of insuring greater safety in transportation, the coated blocks may be inclosed in paper or metal boxes.

I am aware that caustic alkali has been inclosed in jars, casks, metal boxes, and the like; but these vessels are too expensive for this purpose. I am also aware that a variety of substances have been applied on the surfaces of the alkali blocks; and I make no claim, broadly, to a water and air proof coating.

One great advantage of my compound coating over others is that it hardens with age, and is not affected by changes of temperature, and another advantage is that it is inexpensive.

What I claim as new, and desire to secure by Letters Patent, is—

A coating for blocks of caustic alkali, consisting of a fine earth and an oil mixed together in about the proportions specified.

In testimony that I claim the above I have hereunto subscribed my name in the presence of two witnesses.

T. C. TAYLOR.

Witnesses:
GEORGE E. UPHAM,
JOS. B. LOOMIS.